Figures 1, 2:
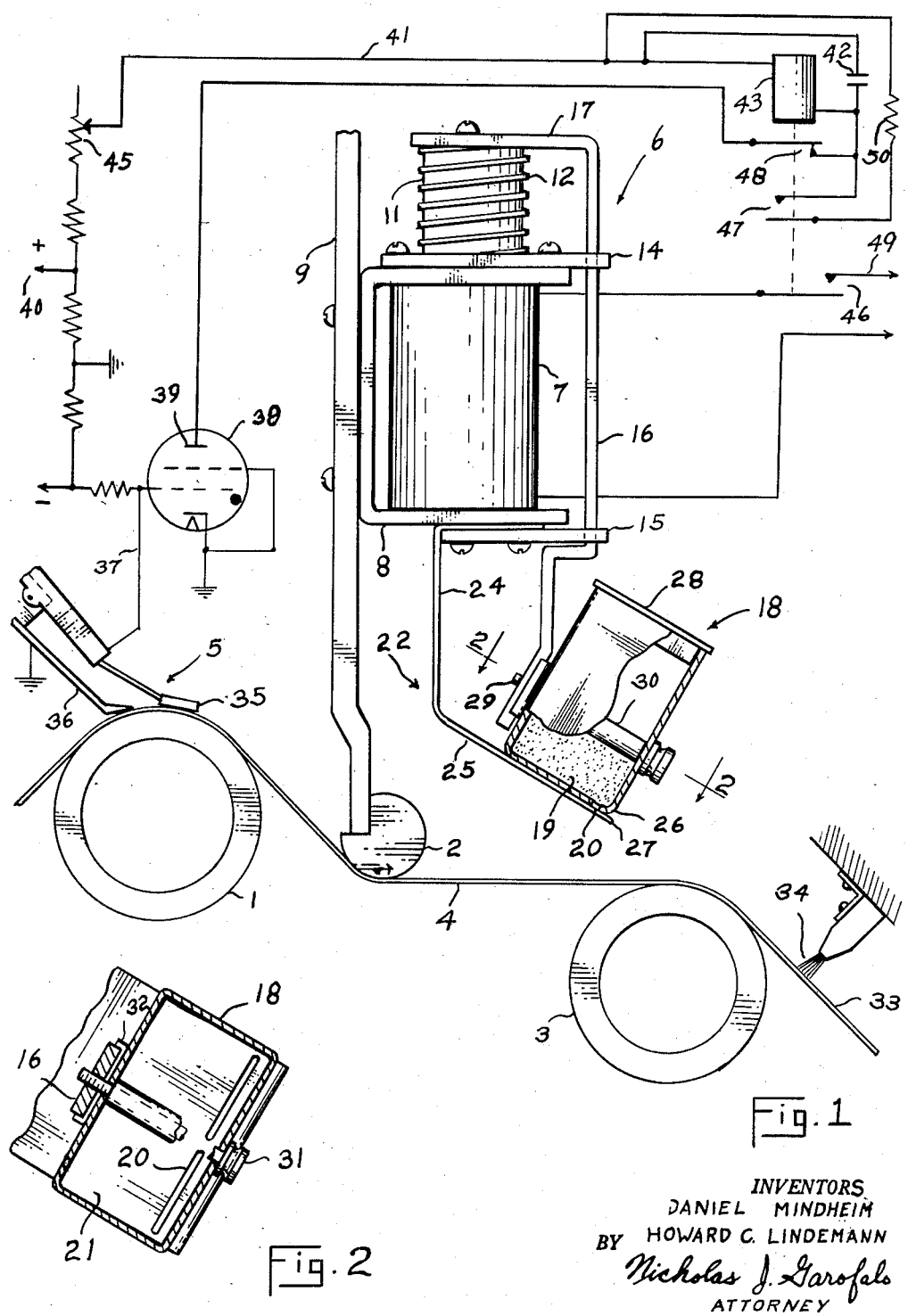

May 13, 1958　　D. MINDHEIM ET AL　　2,834,206
SLUB MARKING MECHANISM
Filed Sept. 30, 1955

INVENTORS
DANIEL MINDHEIM
BY HOWARD C. LINDEMANN
Nicholas J. Garofalo
ATTORNEY

United States Patent Office 2,834,206
Patented May 13, 1958

2,834,206

SLUB MARKING MECHANISM

Daniel Mindheim, Glen Cove, and Howard C. Lindemann, Westbury, N. Y., assignors to Lindly & Company, Inc., Mineola, N. Y.

Application September 30, 1955, Serial No. 537,654

6 Claims. (Cl. 73—159)

This invention concerns novel and improved marking mechanism of a practical nature, which has many advantages and which, while subject to wide application, finds special use in textile machines of the slub detecting type.

An object of the invention is to provide novel and improved marking mechanism which is solenoid operated and functions to deposit a powdered chalk mark upon material subject to inspection so as to visibly indicate the location of a defect in the material.

Another object of the invention is to combine such a marking mechanism in inspection apparatus, such as slub detecting apparatus, to visibly mark the location of a defect detected in material passing through the apparatus.

A still further object of the invention is the provision of solenoid operated marking mechanism in moving sheet material inspection apparatus, which mechanism is operable to visibly indicate a defect in the material subsequent to detection thereof, and which is promptly restorable to normal and prepared for the next detected defect.

Another object of the invention is novel circuitry for effecting a desired time operation of the marking mechanism in such inspection apparatus and for effecting instantaneous restoration of the circuit to normal for immediate subsequent operation thereof.

A more particular object of the invention is a novel and improved container for holding, and dispensing when required, a deposit of powdered chalk.

A further particular object of the invention is a novel circuit which effects at a predetermined time after application of a signal thereto momentary energization of a load, and immediately after the later action automatically restores to normal condition for reception of a subsequent signal.

The invention further lies in the structure of the component elements thereof, as well as in their general arrangement and cooperative association to produce the results intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a front elevational view of solenoid operable powdered chalk marking mechanism embodied in textile slub detecting apparatus; and Fig. 2 is a section of the dispensing container, taken on the line 2—2 of Fig. 1.

In describing the invention in further detail, reference is now directed to the drawings, wherein like parts are designated by like numbers.

There is shown in the drawings apparatus for detecting defects, such as slubs in textile sheet material. The apparatus comprises a plurality of horizontally disposed cylindrical members 1, 2 and 3, positioned at different levels, and having highly polished surfaces over which a web 4 of sheet material is adapted to be drawn at a predetermined speed by suitable means, not shown. The apparatus includes suitable sensing means, such as indicated at 5, which rests upon the moving web above the cylinder 1, and which serves to sense defects, such as slubs, in the moving web. Thick spots, seams, and other unevennesses or raised defects in the web are commonly called slubs.

Upon detection of a slub the sensing means is actuated by the defect to establish an energizing circuit to solenoid operable powdered chalk marking mechanism, generally designated at 6. This effects a deposit of chalk upon the web of cloth over the sensed defect so as to visibly mark or indicate to the operator the location of the defect.

The solenoid operable mechanism 6 comprises a solenoid member 7 mounted in a C bracket 8 fixed to the framework 9 of the detecting apparatus. The solenoid includes a core slug 11 normally tensioned by a coil spring 12 to a vertical elevated position.

Guided for vertical up and down movement in slots, formed in the opposed free ends 14, 15 of the solenoid bracket, is a vertically disposed riged member or bar 16. The upper end of the latter bends at right angles to provide a flange 17 which is bolted at its free end to the top of the solenoid slug. To the lower end of bar 16 is mounted a container 18 of powdered chalk 19. It is clear, that when the solenoid is energized, the container will descend sharply as slug 11 is sucked down into the solenoid. This action causes the powdered chalk to drop through narrow slots 20 in the bottom wall 21 of the container. A shaking action is imparted to the container by the combined sharpness of the drop, and by the subsequent limitation of the flange end 17 of the supporting bar 16 upon the upper arm 14 of the solenoid C bracket as the core plunges down into the solenoid. The chalk dispensed from the container drops upon the moving web below, making a visible mark on the latter, indicating the location of the detected slub.

When the solenoid is de-energized, the slug and container are returned to normal by coil spring 12.

To guard against dropping of chalk from the container at times other than when the solenoid is actuated, the dispensing slots 20 are normally closed over by a covering member 22. The latter is in the form of a broad leaf spring the upper portion 24 of which is fixed at its end to the lower bracket arm 15, and the free lower portion 25 of which is offset so as to cover over the bottom wall and slots 20 of the container. By this structure, descent of the container forces the bent end 25 downward sufficiently to displace it from the container slots. The displaced spring restores to normal upon return of the container.

The container 18 is preferably oblong, though it may well be formed otherwise, and is desirably disposed at an angle, as indicated, so that one edge, here edge 26, of the container is lowermost and a little above web 4, that passes beneath. This arrangement tends to center the chalk in the container directly over the dispensing slots which are parallel to and slightly inward from this lowermost edge of the container. This arrangement further provides a better cooperative relation of the spring member in closing over and uncovering the slots. In this arrangement the upper portion 24 of the spring depends vertically, and the lower portion slopes off at an angle substantially parallel to the bottom wall of the container. It can be seen by this structure that when the container is dropped, it will tend to slide the spring away from the slots, and when restored will enable the spring to slide back to cover the slots. It is to be noted that the free end 27 of the spring extends only slightly beyond the slots, so that the latter is quickly uncovered.

The container has a removable cover 28 to enable replenishment of the chalk supply.

A further feature of the container is that it is readily detachable from the supporting member 16 to permit repairs, and cleaning or replacement of the container. To this end, a single screw member 29, passing through the container front and rear walls, and through an intermediate sleeve 30 within the container, threadedly engages at its end in the supporting bar 16. A knob 31 on the screw permits manual release of the latter and consequent removal of the container from member 16. Further, the container has integral with its rear wall a U bracket 32 into which a complementary end portion of member 16 engages. The free end of the screw passes through this bracket to engage member 16. This structural arrangement not only holds the container to its support, but also restrains it against angular movement.

It is to be noted that the web moves below the container on a level plane. This is enabled by the cylindrical members 2 and 3. It is desired so that the chalk will be localized on the spot where it falls, and will not scatter over a wide area, as would otherwise happen if it were to drop upon an inclined surface.

It is also to be noted that the web moves down a sharp incline, as at 33, where it rubs in contact with a brush 34 mounted to the framework and disposed substantially perpendicular to the web. The brush functions to rub the chalk into the cloth web as the latter passes by, thereby making the marking of the slub heavy and more lasting for subsequent visual inspection by the operator.

The chalk dispensing mechanism is necessarily located a short distance, as indicated, rearwardly of the sensing mechanism 5 to avoid crowding and because of the space required by the latter mechanism as well as by its own structure. A time delay in the operation of the chalk dispensing mechanism is, therefore, required after detection takes place. This is to enable the moving web to carry the detected slub to a position substantially beneath the dispensing container 18 before the solenoid 7 is energized, and so that when the latter is energized, the dispensed chalk will fall upon or in close proximity to the slub. This time delay is provided for in the circuit shown in Fig. 1. The circuit also provides for immediate automatic resetting of the solenoid subsequent to its operation to prepare it for a subsequently detected slub.

Now, in the operation of the apparatus described, consequent upon detection of a slub in the moving web by the feeler element 35 of the sensing mechanism, the latter is activated during the movement of the raised slub defect to make contact with the grounded underlying member 36 of the sensing mechanism, whereupon the grid line 37 of the thyratron tube 38 is grounded upon the latter event, and due to a positive charge placed upon the thyratron plate 39 from a suitable D. C. source 40 over the line 41 and capacitor 42, current flows through the thyratron. Energization of the relay 43 connected in parallel with the capacitor 42 in the plate line is delayed pending firing of the thyratron and subsequent charging of the capacitor. This delay is further regulated by the variable resistance 45. Consequent upon energization of relay 43, contacts 46 and 47 close, and contacts 48 open. The latter action cuts off the thyratron flow. Closing of contacts 46 in the source line 49 establishes a circuit that energizes solenoid 7 in time to drop powdered chalk upon or in close proximity to the slub now passing below. Energization of solenoid 7 is momentary after the thyratron has been cut off, and it lasts only long enough to effect a descent action of the container 18. This is due to the cutting off of flow through the thyratron, and the subsequent quick discharge of the capacitor through the relay and the parallel connected resistance 50. De-energization of relay 43 restores spring contacts 46, 47, and 48. Solenoid 7 is de-energized, and the coil spring 12 automatically resets it, whereupon the solenoid and the circuit are again in normal condition for reception of a subsequent slub detection signal from the sensing mechanism.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is our intent, therefore, to claim the invention not only in the form shown and described, but also in all such forms and modifications as can reasonably be construed to fall within the spirit of the invention and the scope of the appended claims.

What is claimed is:

1. In combination, mechanism for detecting a defect in a moving textile web, an electromagnetic device, circuit means for energizing the latter in response to the detecting means, powder dispensing means removed from the detecting means and superimposed above the moving web and actuable by the electromagnetic device for placing a visible powder deposit upon the moving web, means in the circuit for delaying energization of the electromagnetic device until the raised defect has arrived substantially beneath the powder dispensing means, and means effective subsequent to imposition of the powder upon the web to rub the powder into the web.

2. In apparatus for inspecting moving web material for defects, including mechanism for sensing such defects, and an electrical circuit closable by the latter mechanism upon sensing a defect: a can superimposed above the moving web having a perforated bottom and holding powdered chalk, an electromagnetic operated plunger in the circuit holding the can and being responsive to a sensing action of the sensing mechanism to plunge the can downward, whereby powdered chalk is caused to drop through the perforated bottom of the can onto the moving web below, and means in the circuit for delaying energization of the electromagneic operated plunger until the sensed defect has arrived substantially beneath the can.

3. In apparatus including a moving web, means for depositing on and rubbing powdered chalk into the web, said means comprising a plunger disposed above the moving web and retractible by a solenoid, a depending support mounted to the plunger, a container attached to the depending support and having a perforated bottom, means for abruptly limiting a retraction action of the plunger, whereby powdered chalk within the container is caused to be shaken through the perforated bottom, onto the moving web below, and brush means engaging the moving web and being effective subsequent to the deposit of chalk upon the web to rub the chalk into the latter.

4. In apparatus of the class described, comprising a solenoid operated shaker including a slotted bottom through which powdered chalk within the shaker is adapted to fall upon operation of the latter, means for sensing a defect in a web moving below the shaker and for establishing an energizing circuit to the solenoid, and timing means responsive to a sensing action of the sensing means for delaying the establishment of the circuit to the solenoid until the sensed defect has arrived substantially beneath the shaker.

5. In apparatus of the class described including means for sensing a defect in a moving web, a solenoid operated shaker superimposed above the web in removed relation to the sensing means, the shaker having a slotted bottom through which powdered chalk is adapted to fall upon the web following energization of the solenoid, a circuit for energizing the solenoid closeable by the sensing means upon detection of the defect by the latter, and timing means in the circuit for delaying energization of the solenoid until the sensed defect in the moving web has arrived substantially beneath the shaker.

6. A delaying and quick reset circuit system including a thyratron electronic discharge device having grid and plate circuits and being operable upon closing the grid circuit to ground, a variable resistance and a capacitor connected in series in the plate circuit to the thyratron, a relay connected in parallel to the capacitor and energizable subsequent to energization of the thyratron and charging of the capacitor, a pair of contacts in a load line closable upon energization of the relay, a pair of normally closed contacts in the plate circuit openable upon energization of the relay to cut off current flow through the thyratron to the relay, and a further pair of contacts closeable upon energization of the relay in a line to a resistance connected in parallel with the capacitor, whereby the latter is quickly discharged through the relay and the resistance, effecting a momentary holding of the relay and load line contacts subsequent to cutting off of current flow through the thyratron.

References Cited in the file of this patent

UNITED STATES PATENTS

| | | |
|---|---|---|
| 804,259 | Norris | Nov. 4, 1905 |
| 2,089,308 | Sullivan | Aug. 10, 1937 |
| 2,254,197 | Andre | Sept. 2, 1941 |
| 2,282,182 | Gulliksen | May 5, 1942 |
| 2,319,795 | Coffin | May 25, 1943 |
| 2,525,016 | Borell | Oct. 10, 1950 |
| 2,534,299 | Ruiz et al. | Dec. 19, 1950 |
| 2,552,817 | Ross | May 15, 1951 |
| 2,567,473 | Dame | Sept. 11, 1951 |
| 2,681,169 | Watson | June 15, 1954 |
| 2,701,471 | Boynton | Feb. 8, 1955 |
| 2,725,852 | Cramer | Dec. 6, 1955 |
| 2,734,133 | Riley | Feb. 7, 1956 |